(12) United States Patent
Hoedl

(10) Patent No.: US 11,351,908 B2
(45) Date of Patent: Jun. 7, 2022

(54) FOLDABLE WALL STRUCTURE FOR EXTENDING THE INTERIOR SPACE OF TRANSPORTABLE CONSTRUCTIONS, IN PARTICULAR CAMPER VANS

(71) Applicant: Peter Hoedl, Wiedenzhausen (DE)

(72) Inventor: Peter Hoedl, Wiedenzhausen (DE)

( * ) Notice: Subject to any disclaimer, the term of this patent is extended or adjusted under 35 U.S.C. 154(b) by 70 days.

(21) Appl. No.: 17/012,785

(22) Filed: Sep. 4, 2020

(65) Prior Publication Data
US 2021/0070214 A1   Mar. 11, 2021

(30) Foreign Application Priority Data
Sep. 6, 2019 (DE) .................... 10 2019 123 934.6

(51) Int. Cl.
*B60P 3/34* (2006.01)
(52) U.S. Cl.
CPC ..................................... *B60P 3/34* (2013.01)
(58) Field of Classification Search
CPC ..................................... B60P 3/34; B60P 3/36
See application file for complete search history.

(56) References Cited

U.S. PATENT DOCUMENTS

| | | | | |
|---|---|---|---|---|
| 2,484,312 A | * | 10/1949 | Rebours | B60P 3/32 296/172 |
| 3,381,421 A | * | 5/1968 | Sicklesteel | B60P 3/34 296/26.11 |
| 3,598,441 A | * | 8/1971 | Damiani | B60P 3/34 296/164 |
| 3,778,100 A | * | 12/1973 | Dillard | B60P 3/34 296/164 |
| 3,811,723 A | | 5/1974 | Anderson | |
| 4,221,425 A | * | 9/1980 | Welle | B60P 3/34 296/146.11 |
| 5,345,730 A | * | 9/1994 | Jurgensen | E04B 1/3444 52/64 |

(Continued)

FOREIGN PATENT DOCUMENTS

| | | |
|---|---|---|
| CN | 109774577 A | 5/2019 |
| EP | 0344822 A2 | 9/1989 |

(Continued)

OTHER PUBLICATIONS

Australian Patent Office (IP Australia), Examination Report No. 1, dated Mar. 31, 2021, (Office Action on Australian Patent Application No. 2020220213, counterpart to U.S. Appl. No. 17/012,785).

*Primary Examiner* — Gregory A Blankenship
(74) *Attorney, Agent, or Firm* — Rod D. Baker

(57) ABSTRACT

The invention creates a foldable wall structure for extending the interior space of transportable constructions, in particular a vehicle such as a camper van. The foldable wall structure has a first foldable wall which, in the folded-out state, forms a base wall of the wall structure, and a second foldable wall which, in the folded-out state, forms a cover wall of the wall structure. The foldable wall structure has a foldable fourth wall and a foldable fifth wall, which, in the folded-out state, form a first and a second side wall; the wall structure also has a frame structure, in which the wall structure has a third wall that can be translationally shifted relative to the folded-in first wall, the third wall forming an outer wall of the wall structure in the shifted state.

20 Claims, 7 Drawing Sheets

(56) References Cited

U.S. PATENT DOCUMENTS

| | | | | | |
|---|---|---|---|---|---|
| 5,983,576 | A | * | 11/1999 | Hanser | B60P 3/34 296/165 |
| 6,135,525 | A | * | 10/2000 | Amann | B60P 3/34 296/164 |
| 6,560,937 | B1 | * | 5/2003 | Gardner | B60P 3/34 52/201 |
| 7,493,727 | B1 | * | 2/2009 | Broussard | B60P 3/34 296/156 |
| 8,267,453 | B1 | * | 9/2012 | Helgesen | B60P 3/34 296/26.01 |
| 2002/0149220 | A1 | * | 10/2002 | Wishart | B60P 3/34 296/26.15 |
| 2004/0026958 | A1 | * | 2/2004 | Condino | B60P 3/34 296/156 |
| 2006/0053700 | A1 | | 3/2006 | Vance | |
| 2018/0050628 | A1 | * | 2/2018 | Revelino | B60P 3/341 |
| 2018/0319310 | A1 | | 11/2018 | Zhou et al. | |
| 2021/0070214 | A1 | * | 3/2021 | Hoedl | B60P 3/34 |

FOREIGN PATENT DOCUMENTS

| | | |
|---|---|---|
| EP | 1 092 588 A1 | 4/2001 |
| EP | 1092588 A1 | 4/2001 |
| JP | 2003-095262 A | 4/2003 |

* cited by examiner

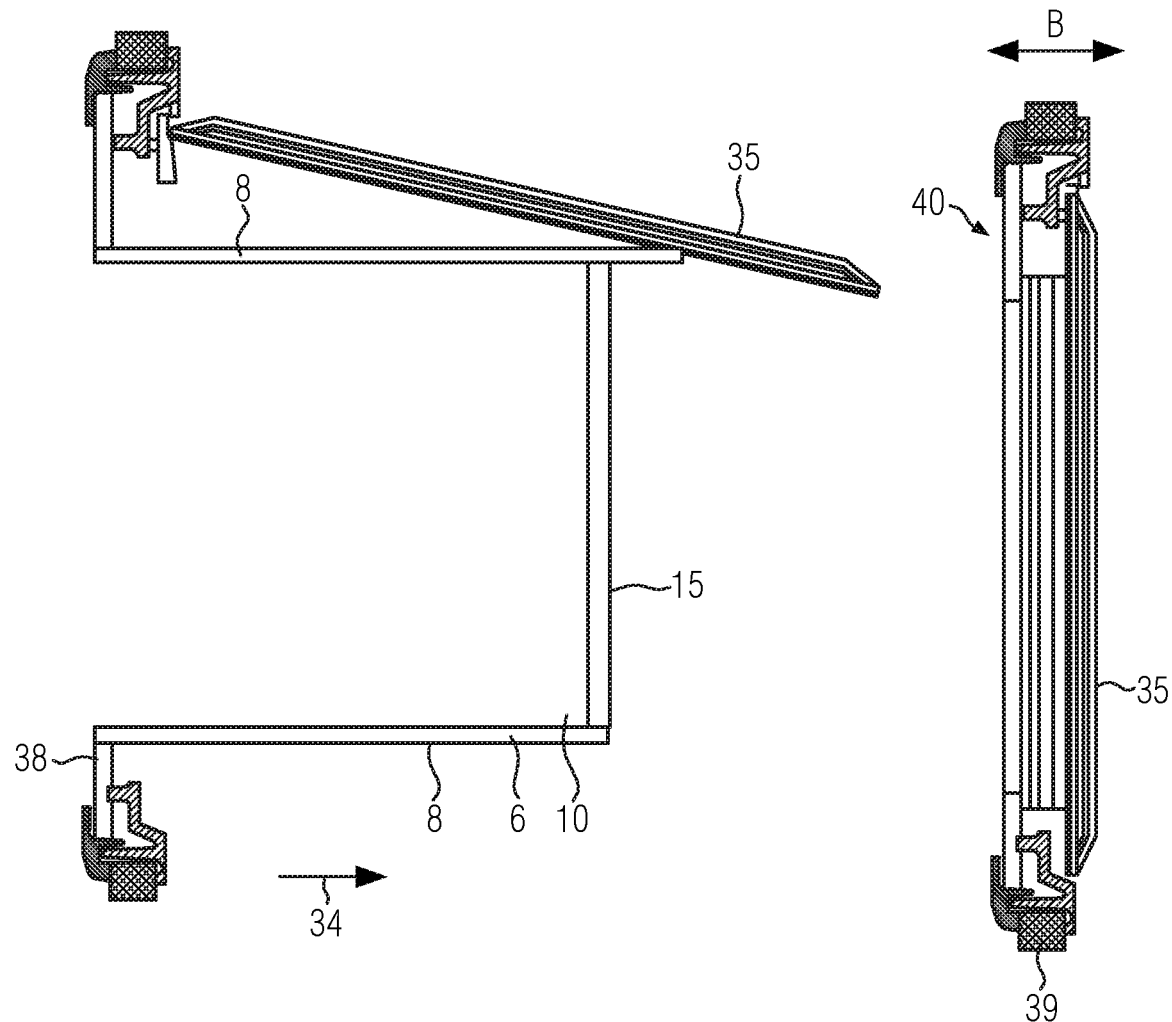

FOLDABLE WALL STRUCTURE FOR EXTENDING THE INTERIOR SPACE OF TRANSPORTABLE CONSTRUCTIONS, IN PARTICULAR CAMPER VANS

CROSS-REFERENCE TO RELATED APPLICATIONS

This application claims priority to German Patent Application No. DE 10 2019 123 934.6 filed 6 Sep. 2019, the contents of which are incorporated herein by reference.

BACKGROUND OF THE INVENTION

Field of the Invention

The present invention relates to a foldable wall structure for extending the interior space of transportable constructions, in particular vehicles such as camper vans. The foldable wall structure has a first foldable wall, which forms a base wall of the wall structure in the folded-out state, and a second foldable wall, which forms a covering wall of the wall structure in the folded out state, and the wall structure has a frame structure.

Such a foldable wall structure can thus be used with a camper van, for example, in order to extend the often narrow interior space of such objects referred to generally as transportable constructions, which can be camper vans, caravans, vending vehicles, fairground vehicles or other transportable constructions, whose interior space is to be temporarily enlarged for extending the interior space.

Background Art

With the camper vans or caravans (mentioned only as an example) or other vehicles, the situation may arise that interior equipment in the form of a sleeping compartment or bed is installed transversely to the longitudinal direction. A result is that the available effective length of the sleeping compartment or bed is limited, and thus there is insufficient length for taller people, which leads to these people not having sufficient space to lie down out straight.

Even with the other mentioned exemplary applications for the use of objects provided for the use of the foldable wall structure according to the invention, such as vending vehicles, for example, there is often the need to temporarily enlarge the storage space or also the interior space of the object necessary for preparing meals or similar.

An extendable oriel is known from DE 20 2016 008 615 U1, which can be extended from the side wall of a caravan according to the "slide-out" principle similar to a drawer. For this purpose, this known device has electrically actuated drive spindles with which the oriel can be extended relative to the side wall and retracted again. A substantial disadvantage of this known structure of an extendable oriel is that the oriel construction in the retracted state protrudes into the interior space of the caravan, and thus takes away space because it projects from the side wall in the direction of the inner side of the interior space.

A foldable oriel feature for caravans and camper vans is known from DE 20 2017 002 903 U1, which is supposed to be suitable for both sleeping and sitting. This known oriel has a base wall that forms a part of the side wall of the caravan or camper van in the folded-in state. If the oriel is folded outwards, then the textile walls are tensioned as side walls of the folded-out oriel. However, these textile walls provide neither prevention from break-ins nor protection from the weather for the oriel. If the oriel is folded out and a rain shower or similar takes place, there is understandably the danger of water penetrating into the interior space of the oriel and eventually into the interior of the camper van or caravan via the slanted base wall of the oriel in the folded-out state.

Finally, a panel truck is known from CH 302 346, which has a foldable wall structure for extending the interior space of the panel truck. A first foldable wall in the folded-out state forms a base wall of the wall structure, and a second foldable wall of the known panel truck in the folded-out state forms a cover wall of the wall structure. The known wall structure also has a foldable fourth wall and a foldable fifth wall which, in the folded-out state, form a first and a second side wall of the wall structure and are formed as rotatable side wings. The individual wall elements of the known foldable wall structure must each be rotated or pivoted individually around a respective axis of rotation to fold out the wall elements, such that the number of work steps for finally enlarging the interior space of the transportable construction is high. Moreover, the known foldable wall structure is neither provided nor suitable for integration into the construction of a camper van or caravan.

Surpassing the foregoing background, an object of the present invention is to provide a foldable wall structure in such a way that the number of necessary steps for extending the interior space is reduced. Moreover, the foldable wall structure according to the invention shall also be suitable for integration into a camper van or a caravan, and suitable for subsequent integration into a camper van or a caravan. To solve this object, the invention has the advantageous features specified in the claims.

SUMMARY OF THE INVENTION

The invention provides a foldable wall structure for extending the interior space of transportable constructions, such as powered or towed vehicles, in particular, camper vans. The foldable wall structure has a first foldable wall, which, when the wall structure is in the folded-out state, forms a base wall of the wall structure, and a second foldable wall, which, in the folded-out state, forms a covering wall of the wall structure. The wall structure has a foldable fourth wall and a foldable fifth wall, which, in the folded-out state, form a first and a second side wall of the wall structure. The foldable wall structure also has a frame structure, wherein the wall structure has a third wall that can be shifted translationally relative to the folded-in first wall, said third wall forming an outer wall of the wall structure in the shifted state.

The invention thus supplies a foldable wall structure for extending the interior space of a camper van, for example, in which, in contrast to the known wall structures, the third wall forming an outer wall of the wall structure does not have to be rotationally pivoted relative to the frame structure, but rather can be simply shifted translationally, i.e. can be simply shifted translationally from the inner position in which the interior space is not yet enlarged to the outer position in which the interior space is enlarged.

BRIEF DESCRIPTION OF THE SEVERAL VIEWS OF THE DRAWING

The invention is explained in more detail below on the basis of the drawing. This shows in:

FIG. 9 is a partially cut-out view of the foldable wall structure in the folded-out state, which has been arranged on a side wall of a camper van, such as in the region of a window opening present on the side wall;

FIG. 10 is a side or end view of the wall structure according to FIG. 9 shown in the folded-in state;

DETAILED DESCRIPTION OF THE INVENTION

Figure 1:
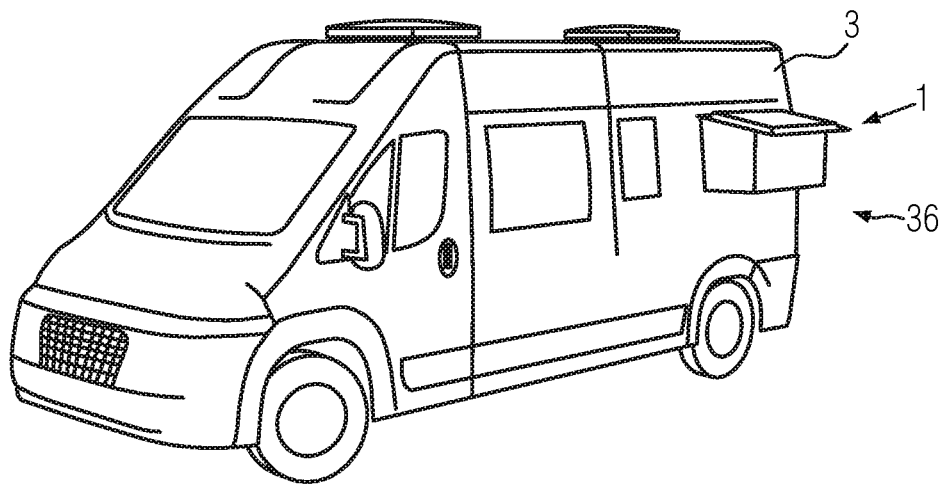
FIG. 1 is a perspective view of a transportable construction in the form of a schematically depicted vehicle, such as camper van, having a foldable wall structure arranged on a side wall of the camper van according to an embodiment of the present invention in the folded-out state.

There is provided a foldable wall structure for extending the interior space of transportable constructions, such as powered or towed vehicles. The invention is suited in particular for use in and in combination with camper vans. The presently described foldable wall structure has a first foldable wall, which, when the wall structure is in the folded-out state, forms a base wall of the wall structure, and a second foldable wall, which, in the folded-out state, forms a covering wall of the wall structure. The wall structure has a foldable fourth wall and a foldable fifth wall, which, in the folded-out state, form a first and a second side wall of the wall structure. The foldable wall structure also has a frame structure, wherein the wall structure has a third wall that can be shifted translationally relative to the folded-in first wall, said third wall forming an outer wall of the wall structure in the shifted state.

Accordingly a foldable wall structure is disclosed herein for extending the interior space of a camper van, for example, in which, in contrast to the known types of such folding wall structures, the third wall forming an outer wall of the wall structure need not be rotationally pivoted relative to the frame structure, but rather can be simply shifted translationally. The third wall can be simply shifted translationally from the inner position (folded-in state) in which the interior space is not yet enlarged, to the outer position (folded-out sate) in which the interior space is enlarged.

Yet in contrast to the known constructions according to the slide-out principle, as mentioned hereinabove, the foldable wall structure according to this disclosure does not protrude into the interior space of the transportable construction in the folded-in state, but rather is arranged to be integrated in the wall construction of, for example, of the vehicular transportable construction. The vehicle's wall receives the foldable wall structure according to the invention, i.e. does not project into the interior space of the transportable construction.

By translationally shifting the third wall—which forms an outer wall of the wall structure in the shifted state, that is to say, for example, an outer wall, which, in the shifted, i.e. extended or folded-out state, spans a plane which lies in parallel to the central longitudinal plane of the transportable construction—the necessity of this outer wall, often constituting an elongated wall with a large surface, having to be pivoted or rotated around a horizontal pivoting axis using corresponding effort by the user of the foldable wall structure according to the invention is eliminated. Such a rotation, in principle, must take place in opposition to the force of gravity acting on the outer wall, and thus takes considerable effort.

The user of the foldable wall structure according to the present disclosure can thus outwardly shift the third wall, constituting the outer wall, in the direction starting from the interior space of the transportable construction by a simple translational displacement movement. In other words, it can be "pulled out," for example, or slid out, and does not have to carry out a pivoting movement or rotational movement on the outer wall. In this way, the present foldable wall structure is deployed by a simple shifting, possible without great effort, of the outer wall and thus enlarging of the interior space of the transportable construction.

According to a further aspect of the system, the third wall is formed with the foldable fourth wall and foldable fifth wall by means of a respective hinge component for shifting the fourth and fifth walls together with the translationally shiftable third wall. Moreover, by means of this configuration, the shifting movement of the third wall advantageously simultaneously leads to the extending movement or folding movement of the fourth and fifth wall of the foldable wall structure. These fourth foldable and fifth foldable walls, for their part, form the respective side walls of the overall wall structure that can be moved out of the side plane of the receiving wall which receives (on the vehicle) the foldable wall structure, or they can be folded. Thus, an oriel type structure, that can fold out or extend from the receiving wall of the transportable construction, is created. The outer wall of the foldable wall structure is formed by the third wall, and the side walls are formed by the fourth foldable and fifth foldable walls, which can be shifted or moved out of the folded-in state together with the translational shifting movement of the third wall in order to form the oriel.

According to a further development of the foldable wall structure, the fourth foldable wall has at least two wall elements, which are moveably coupled in relation to one another by means of a hinge component. This configuration ensures that the fourth wall can be folded in on itself at the hinge component and, when the overall wall structure is in the folded-out state, thus occupy less construction space on one hand and, on the other hand, can be folded up via the translational shifting movement of the third wall in order to form a side wall of the folded-out oriel wall structure.

Similarly, according to a further aspect of the foldable wall structure, the fifth foldable wall has at least two wall elements, which are moveably coupled in relation to one another by means of another hinge component. This configuration ensures that the foldable fifth wall can be folded in on itself at this other hinge component and, in the folded-out state, on one hand thus occupies less construction space and, on the other hand, can be folded up via the translational shifting movement of the third wall in order to form the other side wall of the folded-out oriel wall structure.

According to a further aspect of the foldable wall structure system, the frame structure engages around the foldable first wall when the system is in the folded-in state. This frame structure can be an installation frame, which surrounds or engages around the first wall in the folded-in state and on which the second foldable wall, the third wall, the fourth wall and the fifth wall can also be provided, such that the frame structure together with said walls is formed quasi as an add-on part. For example, the overall foldable wall structure system can be attached retrospectively on a transportable construction in the form of a caravan or camper van, for example. The foldable wall structure can thus also be provided as an accessory part for the vehicle industry.

According to a further aspect of the foldable wall structure, the foldable fourth wall and/or the foldable fifth wall is pivotably attached to the frame structure by means of another respective hinge component. This configuration ensures that the fourth and/or the fifth wall are able to fold out on the frame structure via the respective hinge component, such that the translational shifting movement of the third wall ensures that the foldable fourth wall and/or the foldable fifth wall are automatically and essentially simultaneously extended and folded up together with the shifting movement of the third wall; the respective two elements of the fourth wall and/or of the fifth wall are reconfigured to form a corresponding side wall. That is, two elements form the fourth wall and/or another two elements form the fifth wall, each of which has an elongated configuration in the folded-out state.

According to a further aspect of the foldable wall structure, the frame structure has frame elements connected to one another to form a rectangular frame, which engage around the foldable first wall in the folded-in state, and the frame elements are flat. As a result of this configuration, a frame is created that, when the wall structure is in the folded-in state, has connection surfaces, including the first wall in the folded-in state, via the flat frame elements, via which connection surfaces the frame can be integrated into the wall structure of the transportable constructions. For example, the present wall structure system can be integrated retrospectively in the region of a recess of a vehicle wall structure, which recess was originally provided for a window or a passage of the wall structure, such that, in this way, a retrospective arrangement of the foldable wall structure can be integrated into the wall structure or the wall construction of the transportable constructions. It can be integrated instead of a recess of a camper van or caravan, on which a window or a passage is already provided in any case.

According to a further development of the present wall structure, it is also provided that the frame structure has a frame element extending away at an angle from a plane of the frame structure, on which frame element a hinge component is provided, and on which the second wall is pivotably arranged in relation to the frame element. This frame element extending away at an angle from the frame structure ensures that a canopy or cover of the hinge component is provided on which the second wall provided as a covering wall in the folded-out state can be folded out. This way, a kind of roof for the hinge component is provided via the frame element, and thus the protection from weather is improved.

According to a further aspect of the presently disclosed foldable wall structure, when it is in the folded-in state, the first foldable wall and the second foldable wall are mutually arrangeable to be aligned in substantially parallel relation to one another, so to form a receiving chamber between them, in which the third wall and/or the fourth wall and/or the fifth wall may be received. This configuration ensures that the third foldable wall and/or the fourth foldable wall and/or the fifth foldable wall, together with the first wall and the second wall, form a compact overall structure which, in the cross-sectional direction, has a width that corresponds at least extensively to the width of the wall structure of the transportable constructions. This width may correspond, for example, to the width of an outer wall of a camper van or caravan, and thus the foldable wall structure does not protrude into the interior space of the camper van or caravan in the folded-together or folded-in state. In this regard it differs substantially from known foldable extension type structures, which, in the retracted state, are set with slide-out systems; such drawer-like units that can be shifted outwards, when not extended, considerably reduce the interior space of the camper van or mobile home or caravan.

According to a yet another aspect of the foldable wall structure, the fourth wall and/or the fifth wall is arranged between the first foldable wall and the third foldable wall in the folded-in state. As a result of this sandwich-like structure, like by the similarly sandwich-like structure of the arrangement, lying one on top of the other, of the further walls of the foldable wall structure, the small width that has already been mentioned and is directed in the cross-sectional direction of the foldable wall structure is achieved and the interior space already mentioned above in the folded-in state is not reduced.

Still further, it is already provided that the first wall and/or second wall and/or third wall and/or fourth wall and/or fifth wall have a respective rigid, non-textile, structure, such that, on one hand, protection from the weather, which cannot be achieved by textile structures, is achieved and, on the other hand, the folded-out oriel also constitutes prevention from break-ins, which cannot be rendered by textile structures that may be cut or torn.

According to a further development of the present foldable wall structure, the various hinge components are formed to be at least extensively fluid-tight and are formed as film hinges. This configuration ensures that, in contrast to known devices, no moisture or dampness or rain can enter the interior space of the folded-out oriel via the hinge components.

The present foldable wall structure may have a transparent cover on an outside, said cover having dimensions that correspond at least extensively to the dimensions of the second wall. In this way, a configuration is created that, when the wall structure is in the folded-in state, the foldable wall structure appears optically on the outside of the wall of the camper van or caravan mentioned as a window, and thus does not significantly differ in appearance from the outer structure of the camper van or caravan having such window surfaces. In addition, the transparent cover can be provided on the frame structure, for example to be foldable upwards, such that, via the transparent cover, the folded-out wall structure appearing as an oriel covers in the folded-out state.

It is also provided that the presently disclosed foldable wall structure has a peripheral frame engaging around an access opening to the interior space of the folded-out wall structure. Said peripheral frame is formed pivotably relative to the main frame structure, and the folded-out wall structure being pivotably formed on said frame relative to a transportable construction (vehicle) receiving the wall structure. With this design, the folded-out wall structure can be pivoted relative to the frame structure provided an installation frame for mounting the wall structure on a vehicle. For example, this may make it possible to compensate for a slanted installation situation on the outer wall of the vehicle, which is formed to be slanted relative to the base plate of the motor vehicle. Thus, it can be achieved via the pivoting movement of the wall structure relative to the frame structure that the folded-out wall structure has an underside or base plate which runs extensively in parallel to the underside or base plate of the vehicle, whereby it is avoided that the base wall of the wall structure is slanted in the folded-out state.

Finally, according to the present disclosure, a transportable construction, i.e. a vehicle (motorized or towable), is also provided having a foldable wall structure, in which the wall structure is integrated into a lateral side wall and/or front side wall and/or rear side wall of the vehicle by means of the frame structure; in a cross-sectional view in the folded-in state, the foldable wall structure has a width, in the cross-sectional direction, that at least extensively correlates to the wall structure of the side wall and/or front side wall and/or rear side wall of the vehicle. In the non-folded-out state, the foldable wall structure thus does not protrude into the interior space of the vehicle and thus does not limit or curtail the available interior space.

FIG. 1 of the drawings shows a perspective view of a transportable construction, in the form of a schematically depicted camper van 36, having a foldable wall structure 1 arranged on a side wall of the camper van according to an embodiment of the present invention. The foldable wall structure 1 is seen in the folded-out state. An interior space 2, seen in more detail in FIG. 12, extends from the side wall 3 of the camper van 36 in the direction of the inside 4 of the vehicle, and can be clearly enlarged by the foldable wall structure 1 in the folded-out state.

Figure 2:
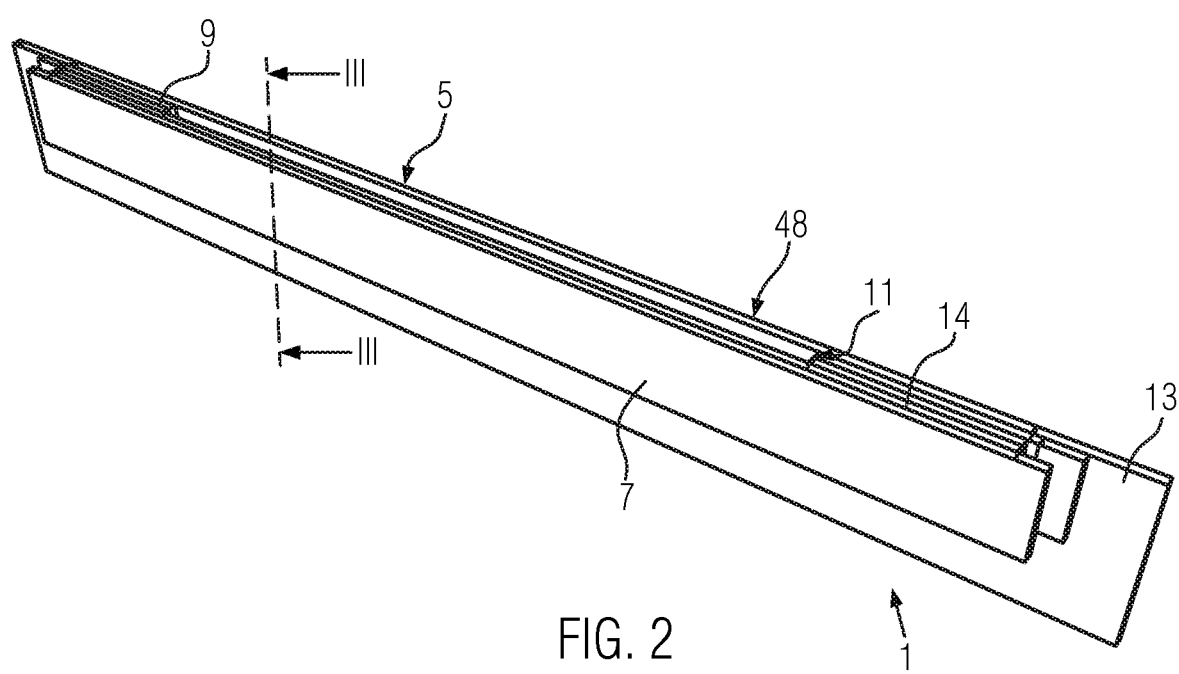
FIG. 2 is a perspective depiction of a foldable wall structure according to the present invention in the folded-in state.
Figure 4:
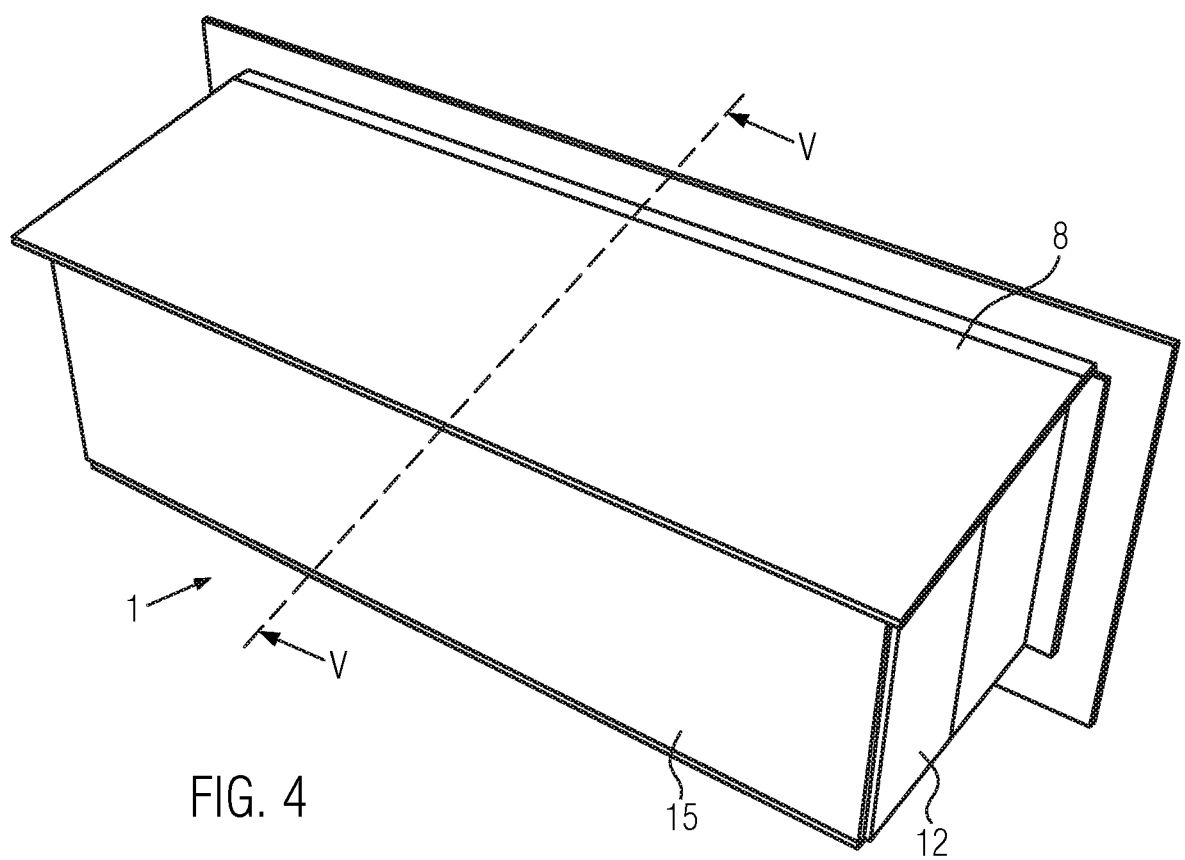
FIG. 4 is a top perspective view of the foldable wall structure in a folded-out state.
Figure 6:
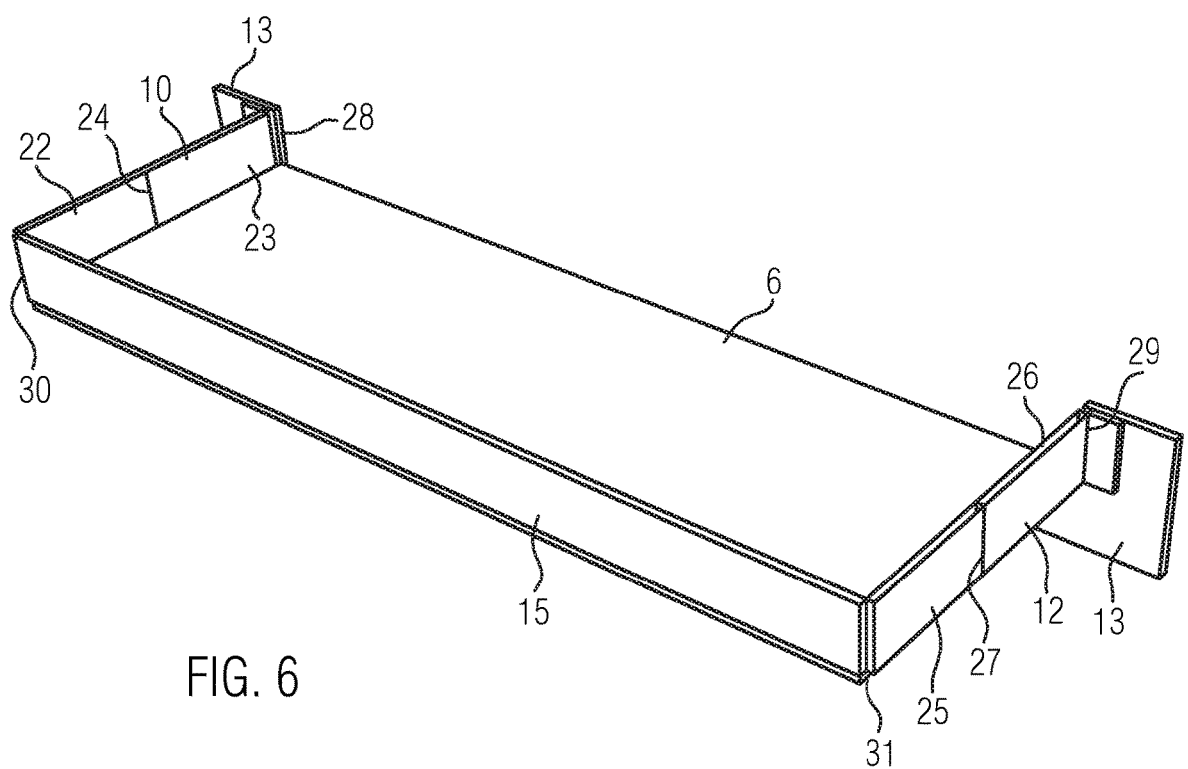
FIG. 6 is a perspective view of the foldable wall structure in the folded-out state in a view from above, in which the cover wall has been omitted to reveal the further construction.

As can be seen in more detail in FIG. 2, the foldable wall structure 1 has a first foldable wall 5 that, in the folded-out state—see, e.g., FIG. 6—has a base wall 6 of the wall structure, and a second foldable wall 7 that, in the folded-out state—see, e.g., FIG. 4—forms the cover wall 8 of the wall structure. Moreover, the foldable wall structure 1 has a foldable fourth wall 9 that, when the structure 1 is in the folded-out state, forms a side wall 10, as seen in FIG. 6, and also a foldable fifth wall 11 that forms a second side wall 12, which can also be seen in FIG. 6.

Figure 12:
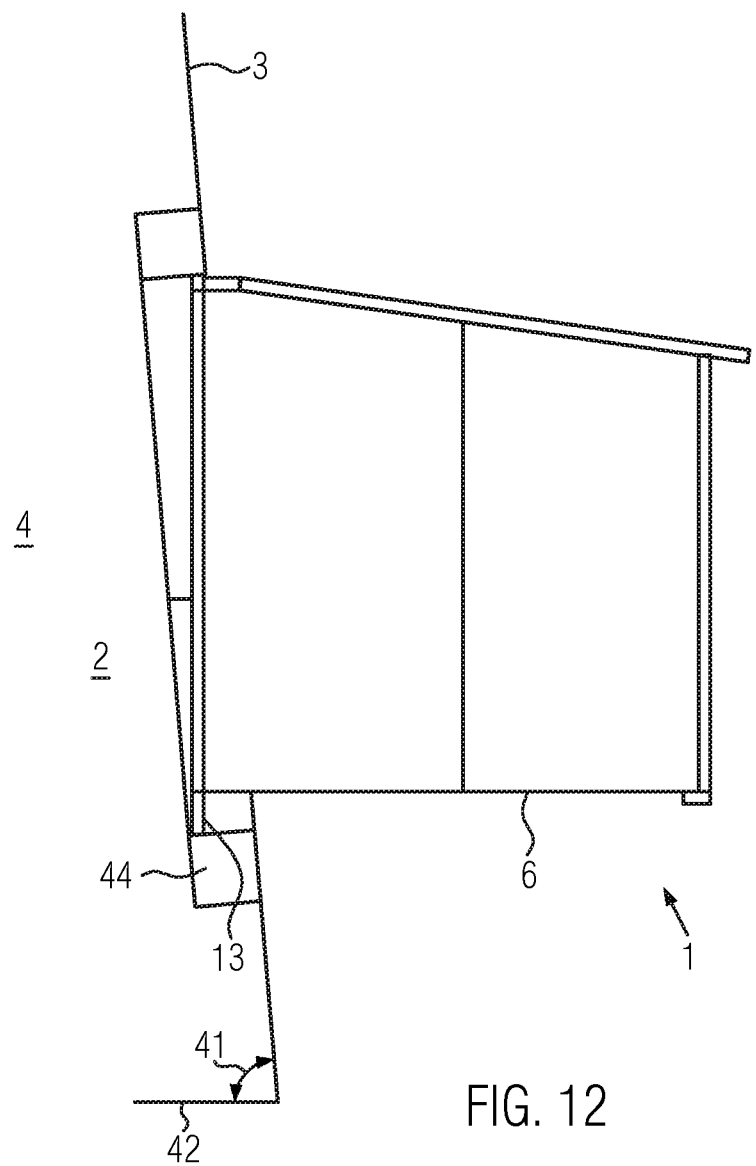
FIG. 12 is a side or end sectional view of a foldable wall structure arranged on a slanted side wall of the vehicle according to the embodiment seen in FIG. 11.

The foldable wall structure 1 also has a frame structure 13 which is formed as an installation frame, for example, which is provided for mounting the foldable wall structure 1 on the side wall 3 of the transportable construction in the form of a camper van 36 or other vehicle, as can be seen in FIG. 12. The foldable wall structure 1 also has a third wall 14 which, in the translationally shifted state, constitutes an outer wall 15 of the foldable wall structure 1 in the folded-out state, as can be seen in FIG. 4.

Figure 3:
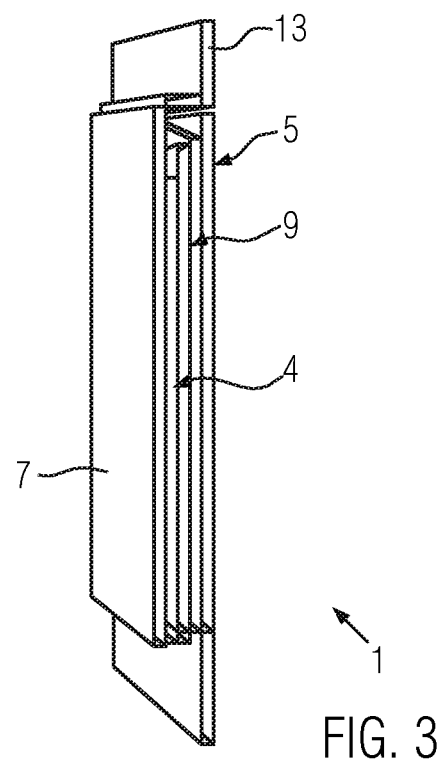
FIG. 3 is a perspective depiction of the foldable wall structure in a sectional view taken along plane III-III in FIG. 2.

FIG. 3 shows the foldable wall structure 1 in the folded-in or folded-together state. As is readily obvious, the frame structure 13 encloses the first foldable wall 5 forming the base wall 6 in a peripheral manner. The fourth foldable wall 9 abuts on the first foldable wall 5 and, as can be seen in FIG. 2, the foldable fifth wall 11 also abuts on the first wall 5 in a similar manner. Moreover, a layer for the base wall 6 folded downwards is provided on the foldable fourth wall 9 and the foldable fifth wall 11.

Figure 5:
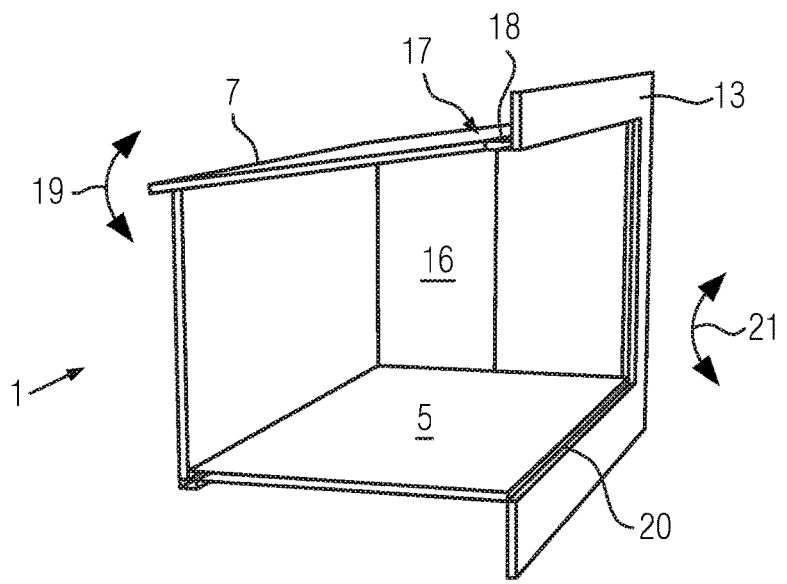
FIG. 5 is a sectional view of the wall structure taken along plane V-V according to FIG. 4.

In a folded-together state, the third wall 14 forming the outer wall 15 abuts on the two walls 9 and 11, to which third wall the second wall 7 attaches, which, in the folded-out state, forms the cover wall 8, as seen in FIG. 4 for example. In the folded-out state, the cover wall 8 and the base wall 6 can be fastened to the outer wall 15 via latches (not depicted in more detail), such that an unauthorized opening of the cover wall and the base wall can be avoided. In the folded-out state, the base wall 6 abuts on the outer wall 15 with the rear face, such that an unintentional folding in or folding together of the folded-out wall structure is avoided. FIG. 4 illustrates the foldable wall structure 1 in the folded-out state in which the cover wall 8 abuts on the first and second side walls 10, 12, and outwardly closes off the interior space 16; the interior space 16 of the foldable wall structure 1 is seen in FIG. 5. In a similar manner, the first foldable wall 5, which forms the base wall 6 of the foldable wall structure 1 in the folded-out state, closes off in the outward direction, as also seen in FIG. 5.

The second foldable wall 7 is arranged on a frame element 18 by means of an upper hinge component 17, that is to say in a pivotable manner indicated by the directional arrow 19 according to FIG. 5, such that the second foldable wall 7 can be folded upwards to form the cover wall 8. Similarly, the first foldable wall 5, which forms the base wall 6 of the wall structure 1 in the folded-out state, is pivotably arranged on the frame structure 13 by means of a first wall hinge component 20, that is to say in the direction of the arrow 21 according to FIG. 5, such that the first foldable wall 5 can be folded downwards in order to form the base wall 6 of the foldable wall structure 1.

Referring to FIG. 6, in which the cover wall 8 has been left out to facilitate explanation, it is seen that the foldable first side wall 10, which is formed from the fourth side wall 9, has two wall elements 22, 23 which are moveably coupled in relation to each other by means of a fourth wall hinge 24. Similarly, the second side wall 12 has two wall elements 25, 26 that are moveably coupled in relation to each other by means of a fifth wall hinge 27. FIG. 6 also shows that the wall element 23 of the first side wall 10 is formed pivotably relative to the frame structure 13 by a fourth wall pivot hinge component 28 and, similarly, the wall element 26 of the second side wall 12 is pivotal relative to the frame structure 13 by a fifth wall pivot hinge component 29.

A first third wall hinge component 30 is provided between the wall element 22 and the outer wall 15 or the third wall 14, and, similarly, a second third wall hinge component 31 is provided between the wall element 25 and the outer wall 15 or the third wall 14. Accordingly, the wall element 22 and the wall element 25 are each moveably coupled to each other relative to the outer wall 15 of the third wall 14.

Figure 7:
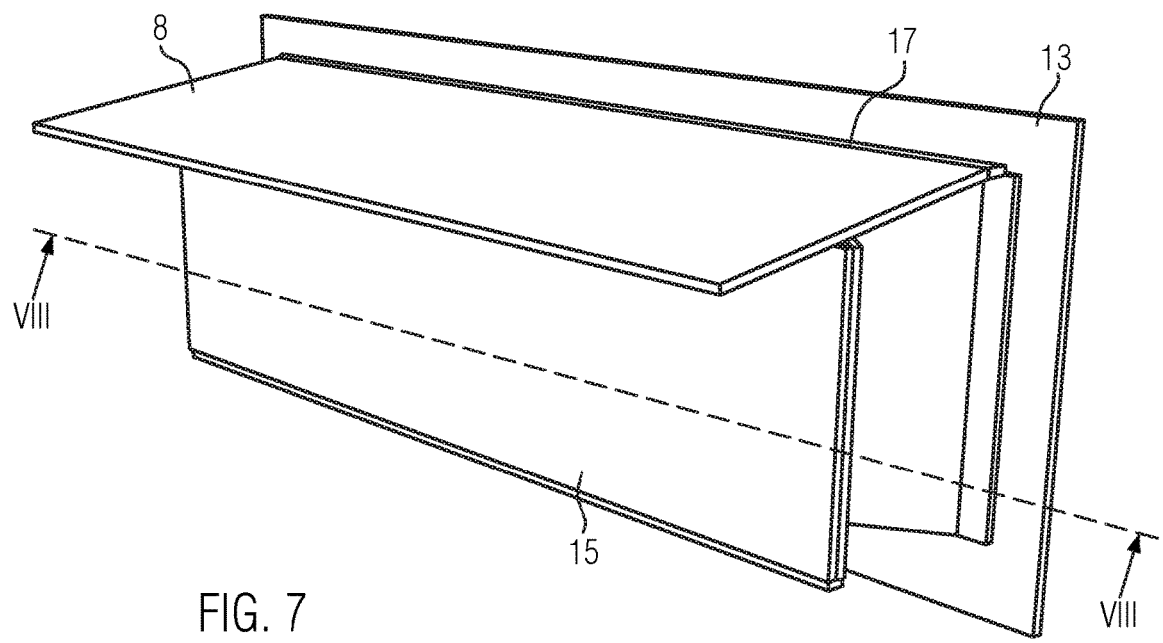
FIG. 7 is a perspective view of the wall structure in the state folded approximately halfway out.

FIG. 7 provides a perspective depiction of the foldable wall structure 1 in a position folded out approximately halfway. As is readily apparent, in order to bring about this position, the cover wall 8 has already been folded upwards on the upper hinge component 17 in relation to the frame structure 13—that is to say, up to such a height that the outer wall 15 can be translationally shifted relative to the still folded-in first wall 5, which forms the base wall 6 in the folded-out state. This also can be seen from the sectional depiction according to FIG. 8, which depicts a perspective sectional depiction of the viewing cut VIII-VIII according to FIG. 7. By means of this translational shifting of the outer wall 15 relative to the base wall 5, an inherently closed and rigid foldable wall structure is created which, in the folded-out state, provides an interior space 16. The interior space 16 substantially enlarges the interior space 2 of the vehicle 36. It also offers protection from the weather in the form, in particular, of protection from water or moisture penetrating into the interior space 16. The penetration of water into the interior space 16 is prevented because the various hinge components 24, 27, 28, 29, 30 and 31 are formed to be watertight, wherefore they are formed as film hinges, for example.

Figure 8:
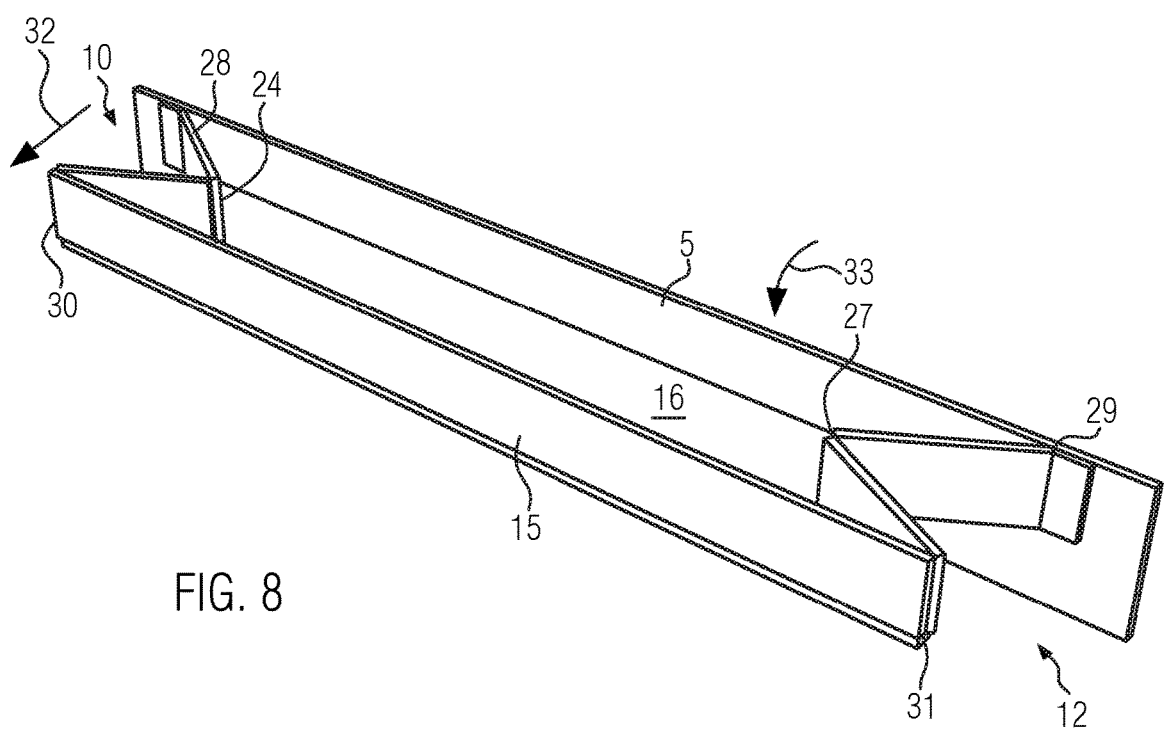
FIG. 8 is a sectional view of the wall structure taken along plane VIII-VIII of FIG. 7.

By the translational shifting of the outer wall 15 in the direction of the arrow 32 in FIG. 8, an extension of the still partially folded-in side walls 10 and 12 to form the configuration seen in FIG. 6 is obtained. In the configuration, the first foldable wall 5, which forms the base wall 6 in the folded-out state, can then be folded under in the direction of the arrow 33; that is to say, by means of the hinge component 20 (which is also formed as a film hinge) the configuration that can be seen in the cut according to FIG. 5 emerges, which can also be seen in a side view by means of FIG. 9.

In the configuration seen in FIG. 9, the outer wall 15 has been shifted completely translationally in the direction of the indication arrow 34, and the foldable side walls 10 and 12 have also been completely folded up or folded out; the folding is by means of the translational shifting movement of the outer wall 15 relative to the still folded-in first foldable wall 5, which forms the base wall 6 in the folded-out state. Moreover, the second foldable wall 7, which forms the cover wall 8 in the folded-out or folded-up state, has been folded out and abuts on the upper limiting edges of the outer wall 15 and the side walls 10 and 12, and seals the interior space 16 against the penetration of water or moisture.

Referring still to FIG. 9, in the folded-up or folded-out state, the foldable wall structure 1 is moreover covered by a transparent cover 35 in the form of a side window of the camper van 36 (depicted in FIG. 1), such that a further improvement of the weather protection is achieved by the transparent cover 35 serving as the side wall window 37.

FIG. 9 also shows that the frame structure 13 can serve as an installation frame 38 in the side wall 3 of the camper van 36. Also, per the configuration depicted in FIG. 10, the foldable wall structure 1 shows in the folded-together state that, in the folded-together state, the foldable wall structure 1 has a dimension or width measured in the direction of the arrow B according to FIG. 10. This width dimension of the structure 1 is smaller than the width of the wall construction 39 of the vehicle side wall 3. This ensures that, in the depicted embodiment, the foldable wall structure 1 can still be outwardly covered by the transparent cover 35, such that it can be integrated harmoniously and completely into the recess 40 of the side wall 3 of the camper van 36. The foldable wall structure 1 can also be retrospectively installed in a vehicle, for example, because the recess 40 is present in the side wall 3 of the camper van; the transparent cover 35 serving as a side wall window 37 requires access to the interior space 2 of the camper van forming the transportable construction in the depicted embodiment.

As can be seen in FIG. 12, the side wall 3 can have a slanted position as the installation location of a vehicle, serving only as an example for the use of the foldable wall structure 1, such that the angle 41 between the side wall 3 and a base 42 of the camper van 36 assumes a value of less than 90 degrees. This leads to the base wall 6 of the folded-out wall structure 1 experiencing a slanted position. In order to avoid this, according to a modified embodiment of the present structural system, the foldable wall structure 1 has a peripheral frame 44 surrounding an access opening 43 to the interior space 16 of the folded-out wall structure 1, said frame being formed pivotably relative to the frame structure 13, and the folded-out wall structure 1 being pivotal on the peripheral frame relative to the vehicle that is receiving the foldable wall structure.

Figure 11:
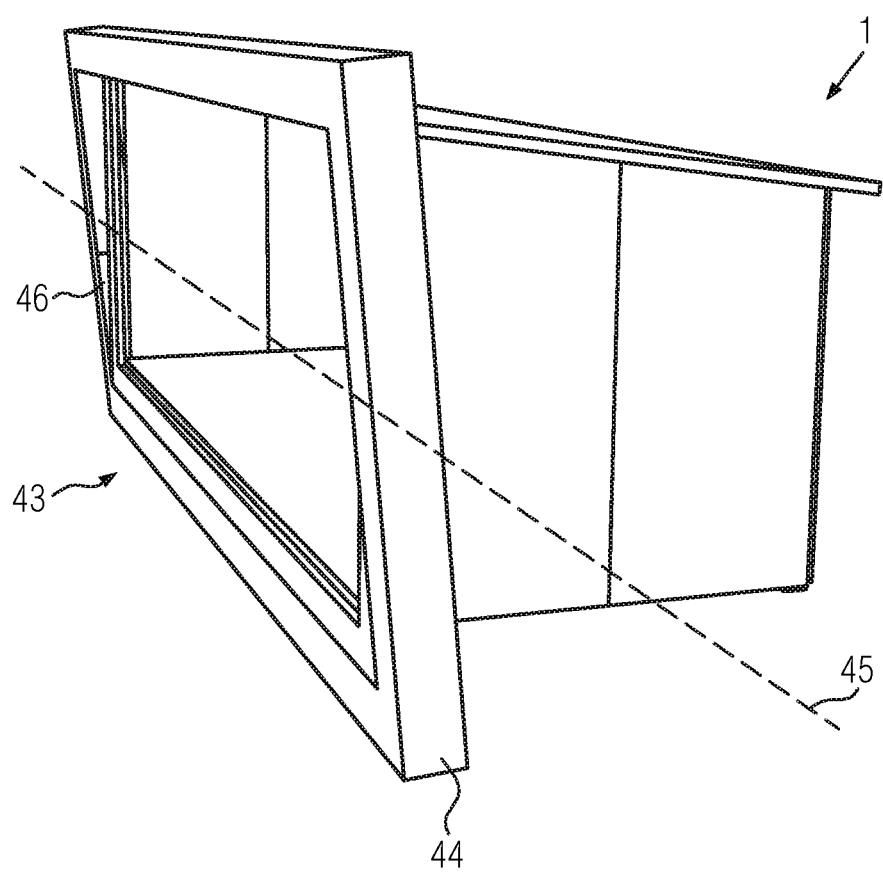
FIG. 11 is a perspective depiction of an embodiment of the foldable wall structure according to the present invention, showing an installation frame arranged pivotably relative to the wall structure.

Such a configuration is depicted in FIGS. 11 and 12. The frame structure 13 is arranged pivotably on the frame 44, in such a way that the foldable wall structure 1 can be pivoted on a pivot axis 45 around an angle range which is sufficient such that the side inclination of the side wall 3 can be compensated for, per FIG. 12. Moreover, a limitation of the angle of rotation in the form of a pivot stop 46 is provided between the peripheral frame 44 and the frame structure 13, with the stop preventing a pivoting of the foldable wall structure 1 on the pivot axis 45 beyond an angle region which is necessary for compensating for the side inclination of the side wall 3. The frame structure 13 has several frame elements 47, which are connected to form a rectangular frame, to form the frame structure 13. In the folded-in or folded-together state, which can be seen in FIG. 2, a receiving chamber 48 is formed between the first wall 5 and the second wall 7, in which the third wall 14 and the fourth wall 9, as well as the second wall 7, are received.

The foldable wall structure 1 according to the invention is characterized, in particular, in that it allows an extension of the interior space of the vehicle, to which the wall structure is attached, without it protruding into the interior space of the vehicle in the folded-together or folded-in state and. In this way, it is avoided that the interior space is reduced via the folded-together wall structure 1.

In terms of features of the invention not explained individually in more detail above, reference is generally made explicitly to the claims and the drawing figures.

LIST OF REFERENCE NUMERALS 1. foldable wall structure
2. interior space
3. side wall
4. inside of the vehicle
5. first wall
6. base wall
7. second wall
8. cover wall
9. fourth wall
10. first side wall
11. fifth wall
12. second side wall
13. frame structure
14. third wall
15. outer wall
16. interior space
17. hinge component
18. frame element
19. arrow
20. hinge component
21. arrow
22. wall element
23. wall element
24. hinge component
25. wall element
26. wall element
27. hinge component
28. hinge component
29. hinge component
30. hinge component
31. hinge component
32. arrow
33. arrow
34. arrow
35. transparent cover
36. camper van 37. side wall window
38. installation frame
39. wall construction
40. recess
41. angle
42. carriage base
43. access opening
44. frame
45. pivot axis
46. pivot arm
47. frame element
48. receiving space

What is claimed is:

1. A foldable wall structure for extending an interior space of a vehicle, the foldable wall structure mountable into a vehicle wall by means of a frame structure, the foldable wall structure movable between a folded-in state and a folded-out state and comprising:
   a first foldable wall for forming a base wall of the wall structure when the wall structure is in the folded-out state;
   a second foldable wall for forming a cover wall of the wall structure when the wall structure is in the folded-out state;
   a third wall, translationally shiftable relative to the first foldable wall when the first foldable wall is folded-in, the third wall forming an outer wall of the wall structure when the wall structure is in the folded-out state;
   a fourth foldable wall for forming a first side wall of the wall structure when the wall structure is in the folded-out state; and
   a fifth foldable wall for forming a second side wall of the wall structure when the wall structure is in the folded-out state;
   wherein the first wall and the second wall, when the foldable wall structure is in the folded-in state, are arranged in parallel relation to each other to define a receiving space between them in which the third wall and/or the fourth wall and/or the fifth wall is received; and
   wherein further the foldable wall structure, in a cross-sectional view in the folded-in state, has a width in the cross-sectional direction corresponding approximately to a wall thickness of the vehicle wall.

2. The foldable wall structure according to claim 1 wherein the fourth foldable wall and the fifth foldable wall are connected to the translationally shiftable third wall by third wall hinge components.

3. The foldable wall structure according to claim 1 wherein the fourth foldable wall comprises at least two fourth wall elements moveably coupled in relation to each other by a fourth wall hinge.

4. The foldable wall structure according to claim 1 wherein the fifth foldable wall comprises at least two fifth wall elements moveably coupled in relation to each other by a fifth wall hinge.

5. The foldable wall structure according to claim 1 wherein the frame structure engages around the first foldable wall when the wall structure is in the folded-in state.

6. The foldable wall structure according to claim 1 wherein the fourth foldable wall is pivotably attached to the frame structure by a fourth wall pivot hinge component.

7. The foldable wall structure according to claim 1 wherein the fifth foldable wall is pivotably attached to the frame structure by a fifth wall pivot hinge component.

8. The foldable wall structure according to claim 1 wherein the frame structure comprises flat frame elements connected to one another to define a rectangular frame, and to engage around the first foldable wall when the wall structure is in the folded-in state.

9. The foldable wall structure according to claim 8 wherein the frame structure comprises:
   an extending frame element extending away at an angle from a plane of the frame structure; and
   an upper hinge component on the extending frame element, by which the second foldable wall is pivotably arranged relative to the extending frame element.

10. The foldable wall structure according to claim 1 wherein, when the foldable wall structure is in the folded-in state, the fourth foldable wall is arranged between the first foldable wall and the third wall.

11. The foldable wall structure according to claim 1 wherein, when the foldable wall structure is in the folded-in state, the fifth wall is arranged between the first foldable wall and the third wall.

12. The foldable wall structure according to claim 1 wherein at least one of the first foldable wall, the second foldable wall, the third wall, the fourth foldable wall, and the fifth foldable wall comprises a non-textile rigid structure.

13. The foldable wall structure according to claim 1 wherein the foldable wall structure comprises a transparent cover on an outside, the cover having dimensions corresponding to the dimensions of the second foldable wall.

14. The foldable wall structure according to claim 1 wherein the foldable wall structure further comprises a peripheral frame engaging around an access opening to an interior space within the wall structure when in the folded-out state, the peripheral frame being pivotal relative to the frame structure, and the foldable wall structure being pivotal on the peripheral frame relative to the vehicle.

15. The foldable wall structure according to claim 2, wherein at least one of the third wall hinge components is formed as a substantially fluid-tight film hinge.

16. The foldable wall structure according to claim 3, wherein the fourth wall hinge is formed as a substantially fluid-tight film hinge.

17. The foldable wall structure according to claim 6, wherein the fourth wall pivot hinge component is formed as a substantially fluid-tight film hinge.

18. A foldable wall structure for extending an interior space of a vehicle, the wall structure comprising:
   a first foldable wall for forming a base wall of the wall structure when the wall structure is in a folded-out state;
   a second foldable wall for forming a cover wall of the wall structure when the wall structure is in the folded-out state;
   a third wall, translationally shiftable relative to the first foldable wall when the wall structure is in a folded-in state, the third wall forming an outer wall of the wall structure when the wall structure is in the folded-out state;
   a fourth foldable wall for forming a first side wall of the wall structure when the wall structure is in the folded-out state;
   a fifth foldable wall for forming a second side wall of the wall structure when the wall structure is in the folded-out state;
   a frame structure; and
   a peripheral frame engaging around an access opening to an interior space within the foldable wall structure when in the folded-out state, the peripheral frame being pivotal relative to the frame structure, and the foldable wall structure being pivotal on the peripheral frame relative to the vehicle.

19. The foldable wall structure according to claim 18 wherein the frame structure comprises flat frame elements connected to one another to define a rectangular frame, and to engage around the first foldable wall when the wall structure is in the folded-in state.

20. The foldable wall structure according to claim 19 wherein the frame structure comprises:
- an extending frame element extending away at an angle from a plane of the frame structure; and
- an upper hinge component on the extending frame element, by which the second foldable wall is pivotably arranged relative to the extending frame element.

* * * * *